United States Patent
Matsuda

(10) Patent No.: US 9,296,444 B2
(45) Date of Patent: Mar. 29, 2016

(54) STRADDLE ELECTRIC VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/368,778

(22) PCT Filed: Dec. 28, 2011

(86) PCT No.: PCT/JP2011/007334
§ 371 (c)(1),
(2), (4) Date: Jul. 7, 2014

(87) PCT Pub. No.: WO2013/098893
PCT Pub. Date: Jul. 4, 2013

(65) Prior Publication Data
US 2015/0008053 A1   Jan. 8, 2015

(51) Int. Cl.
| | |
|---|---|
| B62K 11/04 | (2006.01) |
| B62K 11/10 | (2006.01) |
| B60L 11/18 | (2006.01) |
| B60L 3/00 | (2006.01) |
| B60K 1/04 | (2006.01) |
| B62K 19/30 | (2006.01) |
| B60K 1/00 | (2006.01) |

(52) U.S. Cl.
CPC ............. *B62K 11/04* (2013.01); *B60L 11/1874* (2013.01); *B60K 1/04* (2013.01); *B60K 2001/005* (2013.01); *B60L 3/0046* (2013.01); *B60L 11/1875* (2013.01); *B60L 11/1877* (2013.01); *B60L 2200/12* (2013.01); *B60Y 2200/12* (2013.01); *B60Y 2200/126* (2013.01); *B62K 11/10* (2013.01); *B62K 19/30* (2013.01); *B62K 2204/00* (2013.01); *B62K 2208/00* (2013.01)

(58) Field of Classification Search
None
See application file for complete search history.

(56) References Cited

U.S. PATENT DOCUMENTS

| | | | | | |
|---|---|---|---|---|---|
| 5,421,427 | A | * | 6/1995 | Ogawa et al. | 180/220 |
| 5,577,747 | A | * | 11/1996 | Ogawa et al. | 180/220 |
| 5,937,664 | A | * | 8/1999 | Matsuno et al. | 62/259.2 |
| 6,094,927 | A | * | 8/2000 | Anazawa et al. | 62/239 |
| 6,455,186 | B1 | * | 9/2002 | Moores et al. | 429/71 |
| 7,210,550 | B2 | * | 5/2007 | Yonehana et al. | 180/220 |
| 7,451,608 | B2 | * | 11/2008 | Kikuchi | 62/186 |

(Continued)

FOREIGN PATENT DOCUMENTS

| | | |
|---|---|---|
| JP | 03276820 A | 12/1991 |
| JP | 08244473 A | 9/1996 |

(Continued)

OTHER PUBLICATIONS

Japanese Patent Office, International Search Report of PCT/JP2011/007334, Apr. 17, 2012, WIPO, 1 pages.

(Continued)

*Primary Examiner* — Brodie Follman
*Assistant Examiner* — Hilary L Johns
(74) *Attorney, Agent, or Firm* — Alleman Hall McCoy Russell & Tuttle LLP

(57) ABSTRACT

A straddle electric vehicle comprises a battery case accommodating a battery which is an electric power supply for an electric motor; and an air box attached to an upper portion of the battery case, and the air box includes a ram air inlet through which ram air flows into the air box, and a ram air supply port through which the air is supplied from inside the air box to the battery case.

19 Claims, 4 Drawing Sheets

(56) References Cited

U.S. PATENT DOCUMENTS

| | | | |
|---|---|---|---|
| 7,647,788 B2 * | 1/2010 | Okuda et al. | 62/259.2 |
| 7,931,110 B2 * | 4/2011 | Nishiura et al. | 180/220 |
| 2004/0261377 A1 * | 12/2004 | Sung | 55/385.3 |
| 2008/0160395 A1 * | 7/2008 | Okada et al. | 429/99 |
| 2010/0163326 A1 * | 7/2010 | Takamura et al. | 180/68.5 |

FOREIGN PATENT DOCUMENTS

| | | | |
|---|---|---|---|
| JP | 11180169 A | 7/1999 | |
| JP | 2005093144 A | 4/2005 | |
| JP | 2008080986 A | 4/2008 | |
| JP | 2010149786 A | 7/2010 | |
| JP | 2010228660 A | 10/2010 | |
| JP | 2011162152 A | 8/2011 | |

OTHER PUBLICATIONS

European Patent Office, Extended European Search Report Issued in Application No. 11878488.3, Aug. 31, 2015, Germany, 7 pages.

Japanese Patent Office, Office Action Issued in Japanese Patent Application No. 2013-551038, Mar. 31, 2015, 9 pages.

* cited by examiner

STRADDLE ELECTRIC VEHICLE

TECHNICAL FIELD

The present invention relates to a straddle vehicle such as an ATV (all terrain vehicle) or a motorcycle, and a straddle electric vehicle which drives by driving power generated by an electric motor.

BACKGROUND ART

In recent years, a straddle electric vehicle which incorporates as a driving power source an electric motor activated by electric energy stored in a battery has been developed. In the straddle electric vehicle, it is considered that the battery is repeatedly charged and discharged with a current of a great magnitude in response to the acceleration/deceleration operation of the electric motor for moving a vehicle body and thereby generates heat, and therefore it is necessary to appropriately cool the battery. The battery may be exposed to the outside to be cooled by ram air. However, if the battery is seen from the outside, its external appearance is not good. If possible, the battery is covered with a case. Under the circumstances, a configuration is proposed, in which the battery is covered with a battery case, and ram air is introduced into a battery cover through a ram air inlet provided at the lower side of the battery case to cool the battery (see e.g., Patent Literature 1).

CITATION LIST

Patent Literature

Patent Literature 1: Japanese Laid-Open Patent Application Publication No. 2008-80986

SUMMARY OF INVENTION

Technical Problem

If the ram air inlet opens downward, muddy water or the like splashing from a road surface by a wheel is more likely to enter the battery case. To prevent ingress of the muddy water into the battery case, the ram air inlet may be provided with a filter element with small pores. In this case, a passage resistance increases, and as a result, the ram air may not be suitably guided to the interior of the battery case.

Accordingly, an object of the present invention is to provide a straddle electric vehicle which can suitably suppress ingress of moisture into a battery case, and suitably cool a battery with air.

Solution to Problem

The present invention has been developed to achieve the above object. According to the present invention, there is provided a straddle electric vehicle which drives by a driving power generated by an electric motor, comprising: a battery case accommodating a battery which is an electric power supply for the electric motor; and an air box attached to an upper portion of the battery case, wherein the air box includes a ram air inlet through which ram air flows into the air box, and a ram air supply port through which air is supplied from inside the air box to the battery case.

In accordance with this configuration, since the ram air is sent to the battery case via the air box, moisture contained in the ram air can be captured in the air box. This makes it possible to suitably cool the battery by air while suppressing ingress of moisture contained in the ram air into the battery case. In addition, since the air box is attached to the upper portion of the battery case, it becomes possible to reduce a possibility of ingress of rain water into the battery case.

An electric component connected to the battery may be accommodated inside the air box.

In accordance with this configuration, the electric component can be cooled by the ram air while protecting the electric component from the outside by the air box. Therefore, it becomes possible to ensure the reliability of the operation of the electric component which tends to radiate high heat.

The battery case may be provided with an air inlet duct extending upward from an upper portion of the battery case in an interior of the air box, and the ram air supply port may be provided in an upper end of the air inlet duct.

In accordance with this configuration, it becomes possible to suppress a situation in which moisture captured in the interior of the air box is supplied to the battery case through the ram air supply port.

The battery case may be provided with an outlet through which the air flows out of the battery case and an air outlet duct may be connected to the outlet to guide the air discharged from the battery case to the outside.

In accordance with this configuration, it becomes possible to prevent a situation in which air and heat are accumulated inside the battery case, and to smoothly form an air flow moving toward the interior of the battery case.

The air outlet duct may be provided at a rear portion of the air box, and a bypass port may be provided in the rear portion of the air box to communicate an interior of the air box with an interior of the air outlet duct.

In accordance with this configuration, the air flow in the interior of the air box is activated, and thereby the air can be flowed from the interior of the air box to the air outlet duct. By providing the bypass port in a case where the electric component is placed inside the air box, the electric component can be cooled more effectively.

The air box may be placed forward relative to a seat, the air box may cover the upper portion of the battery case from above, and the air outlet duct may cover an upper side of a rear portion of the battery case from the rear.

In accordance with this configuration, the upper portion of the battery unit can be protected appropriately. In addition, the rider can be physically separated away from the battery.

The upper portion of the air box may be openable and closable.

In accordance with this configuration, the space inside the air box can be efficiently utilized as a space in which small articles or the like are accommodated. Also, in a case where the electric component is placed inside the air box, maintenance work of the electric component can be easily carried out.

Advantageous Effects of Invention

As should be appreciated from the above, in accordance with the present invention, it becomes possible to suitably suppress ingress of moisture into a battery case, and suitably cool a battery with air.

DESCRIPTION OF EMBODIMENTS

Hereinafter, embodiments of the present invention will be described with reference to the accompanying drawings. Throughout the drawings, the same or corresponding components are designated by the same reference symbols and will not be described repeatedly in detail. The stated directions are referenced from the perspective of a rider riding in an electric motorcycle which is an exemplary straddle electric vehicle according to the embodiment of the present invention.

Figure 1:
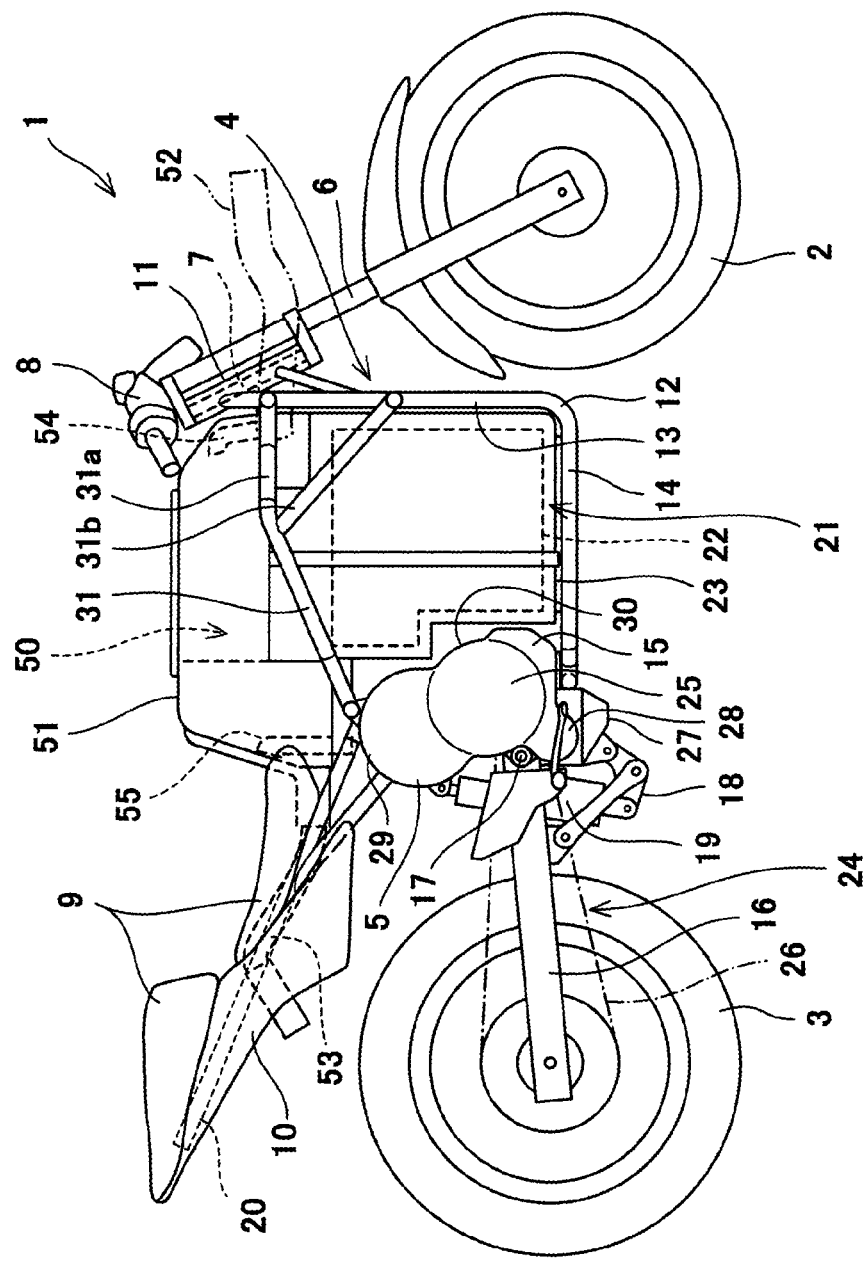
FIG. 1 is a right side view of an electric motorcycle which is an exemplary straddle electric vehicle according to Embodiment 1 of the present invention.

FIG. 1 is a right side view of an electric motorcycle which is an exemplary straddle electric vehicle according to Embodiment 1 of the present invention. As shown in FIG. 1, the electric motorcycle 1 includes a front wheel 2 which is a driven wheel, a rear wheel 3 which is a drive wheel, a vehicle body frame 4 disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by driving power generated by the electric motor 5. In the electric motorcycle 1 of the present embodiment, a driving power transmission mechanism 24 for transmitting a rotation of the electric motor 5 to the rear wheel 3 includes a transmission 25.

The electric motorcycle 1 includes a motor unit case 15 including a motor accommodating section 29 accommodating the electric motor 5 and a transmission accommodating section 30 accommodating the transmission 25 such that the motor accommodating section 29 and the transmission accommodating section 30 are unitarily joined together. In other words, the motor unit case 15 accommodates the electric motor 5 and the transmission 25. The electric motor (or motor accommodating section 29) is positioned above the transmission 25 (or transmission accommodating section 30). The motor unit case 15 is elongated in a direction in which the motor accommodating section 29 and the transmission accommodating section 30 are arranged. As a result, the motor unit case 15 is mounted in the electric motorcycle such that it extends vertically.

The motor accommodating section 29 is provided in the upper portion of the motor unit case 15, while the transmission accommodating section 30 is provided in the lower portion of the motor unit case 15. The bottom portion of the motor unit case 15 constitutes an oil pan 27 for reserving oil. The oil is used as a coolant for cooling the electric motor 5 and an inverter 35 and as a lubricant for lubricating sliding portions of the transmission 25. The motor unit case 15 also accommodates an oil pump 28 which discharges the oil reserved in the oil pan 27. The oil pump 28 is placed between the transmission 25 and the oil pan 27 in a vertical direction.

The front wheel 2 is rotatably mounted to the lower portion of a front fork 6 extending substantially vertically. A steering shaft 7 for steering the front wheel is coupled to the upper portion of the front fork 6, and a handle 8 is attached to the upper portion of the steering shaft 7.

The vehicle body frame 4 includes a head pipe 11, a pair of right and left main frames 12, and a pair of right and left sub-frames 31. The steering shaft 7 is supported by the head pipe 11 such that the steering shaft 7 is rotatable. The main frames 12 are unitarily joined to the head pipe 11 such that the main frames 12 extend rearward and downward from the head pipe 11. The main frames 12 include down frame members 13 extending substantially vertically downward from the head pipe 11 and lower frame members 14 extending substantially horizontally rearward from the lower ends of the down frame members 13. The rear end portions of the lower frame members 14 are joined to the front portion of the transmission accommodating section 30. The sub-frames 31 extend rearward and downward from a region in the vicinity of the head pipe 11, above the main frames 12. More specifically, the sub-frames 31 include first sub-frame members 31a extending rearward from the upper end portions of the down frame members 13, and second sub-frame members 31b coupling the first sub-frame members 31a to the vertical intermediate portions of the down frame members 13. The rear end portions of the first sub-frame members 31a are joined to the upper portion of the motor accommodating section 29. As described above, the motor unit case 15 is joined to the main frames 12 and the sub-frames 31, and the motor unit case 15 is constructed as a portion of the vehicle body frame 4.

A swing arm 16 is pivotally coupled to the motor unit case 15. The swing arm 16 extends in a forward or rearward direction. The swing arm 16 is pivotally coupled at its front end portion to the rear portion of the motor unit case 15 and supports the rear wheel 3 by its rear end portion such that the rear wheel 3 is rotatable. The motor unit case 15 has a flange protruding rearward from the rear portion thereof. A pivot 17 around which the swing arm 16 is pivotable is oriented in a rightward or leftward direction so as to penetrate the flange. In this way, in the present embodiment, the motor unit case 15 serves as a swing arm bracket or a pivot frame for supporting the swing arm 16 such that the swing arm 16 is pivotable.

A link mechanism 18 which operates in response to the pivot motion of the swing arm 16 is provided between the lower portion of the swing arm 16 and the bottom portion (in the present embodiment, oil pan 27) of the motor unit case 15. The lower end portion of a rear suspension 19 is coupled to the link mechanism 18 such that the rear suspension 19 is pivotable. The upper end portion of the rear suspension 19 is coupled to the rear portion of the motor unit case 15 such that the rear suspension 19 is pivotable. In this way, the motor unit case 15 also serves as a fastening suspension bracket for mounting the end of the rear suspension 19 to the vehicle body frame 4.

The motor unit case 15 is also joined to a seat frame 20. The seat frame 20 extends rearward from the upper portion of the motor unit case 15 such that it is inclined upward. A seat 9 on which the rider and a passenger are seated in the forward or rearward direction is mounted to the seat frame 20. The electric motorcycle is a straddle vehicle. The rider is seated on the seat 9 while straddling a vehicle body.

The electric motorcycle 1 incorporates a battery unit 21 as an electric power supply for the electric motor 5. The battery unit 21 includes a battery 22 for storing DC power, and a battery case 23 accommodating the battery 22. The battery case 23 is supported on the lower frame members 14 of the main frames 12. The inverter 35 converts the DC power stored in the battery 22 into AC power. The electric motor 5 is activated by the AC power supplied from the inverter to generate the driving power for moving the vehicle body. The driving power generated by the electric motor 5 is transmitted to the rear wheel 3 via the driving power transmission mechanism 24. This allows the rear wheel 3 to rotate. As a result, the electric motorcycle 1 can drive. As described above, the driving power transmission mechanism 24 includes the transmission 25 and a chain 26. The transmission 25 changes the speed of the rotation of the output shaft of the electric motor 5. The chain 26 transmits the rotation with the changed speed, to the rear wheel 3.

The battery case 23 is placed between the front wheel 2 and the rear wheel 3. More specifically, the battery case 23 is placed forward relative to the motor unit case 15 and rearward relative to the down frame members 13 of the main frames 12. In other words, the electric motor 5 is placed rearward relative to the battery case 23, and the transmission 25 is placed rearward relative to the battery case 23. The battery case 23 is supported on the main frames 12 such that it is placed on the lower frame members 14 of the main frames 12. In this structure, it is not necessary to increase the stiffness of the battery case 23 to an excessively high degree, as compared to a case where the battery case 23 is suspended from the vehicle body frame 4. Furthermore, the pair of right and left sub-frames 31 are placed outward relative to the battery case 23 in a vehicle width direction. This allows the side portions of the battery case 23 to be protected by the sub-frames 31.

The electric motorcycle 1 is provided with an air passage 50 which serves to guide ram air to the interior of the battery case 23 and discharge the air from the battery case 23 to the outside. This allows the battery 22 accommodated in the battery case 23 to be cooled by air. The electric motorcycle 1 includes such major components as members constituting the air passage 50, an air box 51, an air intake duct 52, an air discharge duct 53, an air inlet duct 54, and an air outlet duct 55.

Figure 2:
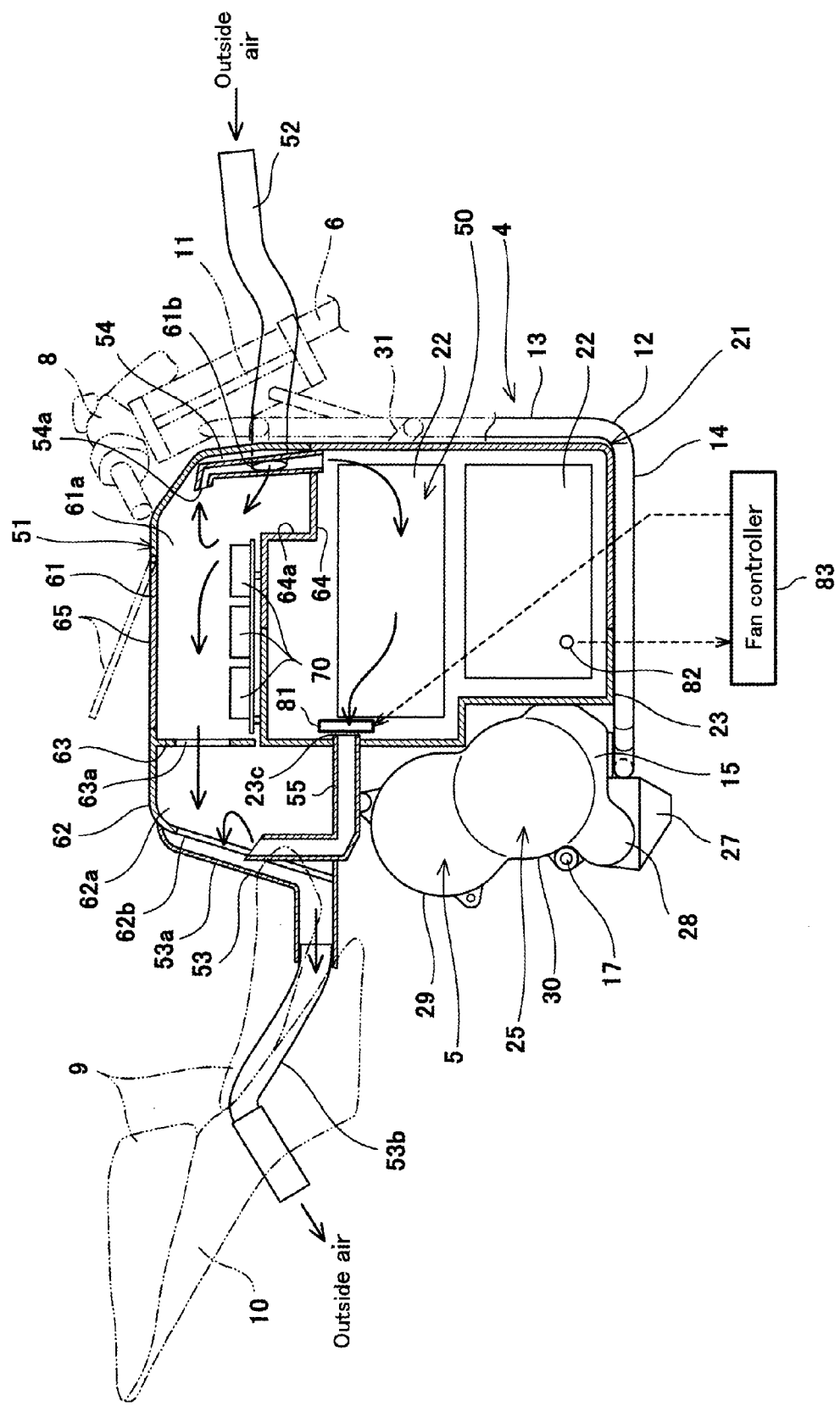
FIG. 2 is a cross-sectional view of a battery case and an air box of FIG. 1.

FIG. 2 is a cross-sectional view of the battery case 23 and the air box 51 of FIG. 1. As shown in FIG. 2, the air box 51 is attached to the upper portion of the battery case 23. The air box 51 includes a front box section 61, a rear box section 62, a partition wall 63, and a bottom wall 64. The front box section 61 covers the upper portion of the battery case 23 from above. The rear box section 62 is provided rearward relative to the front box section 61 integrally with the front box section 61. The partition wall 63 defines an inner space 61a of the front box section 61 and an inner space 62a of the rear box section 62 along the forward or rearward direction. The bottom wall 64 has a bottom surface defining the inner space 61a of the front box section 61 and the inner space 62a of the rear box section 62. The front portion of the bottom wall 64 serves as the upper wall of the battery case 23, and also serves as the wall which vertically defines the inner space 61a of the front box section 61 and the inner space of the battery case 23.

The front box section 61 has a ram air inlet 61b through which the ram air flows into the inner space 61a. The ram air inlet 61b is provided in the front portion of the front box section 61 (front end portion of the air box 51). The air intake duct 52 is connected to the ram air inlet 61b. The front portion of the front box section 61 is placed rearward relative to the head pipe 11 and close to the head pipe 11. The air intake duct 52 extends forward from the front box section 61 and opens in its front end portion which is forward relative to the head pipe 11.

The rear box section 62 covers the motor unit case 15 from above. The rear box section 62 is placed rearward relative to the seat 9 and close to the seat 9. The air discharge duct 53 includes a box cover section 53a covering the rear box section 62 from the rear and a duct section 53b extending rearward from the lower end of the box cover section 53a. The box cover section 53a and the duct section 53b may be separate members, or otherwise the duct section 53b may be composed of plural members.

The rear box section 62 includes an open section 62b which widely opens the rear wall. The box cover section 53a is attached to the rear box section 62 from the rear to close the open section 62b. This allows the inner space 62a of the rear box section 62 to communicate with the interior of the box cover section 53b via the open section 62b. The box cover section 53a vertically penetrates the front end portion of the seat 9. The lower end portion of the box cover section 53a is located below the seat 9. The duct section 53b extends rearward along the seat frame 20 from the lower end portion of the box cover section 53a and is placed below the seat 9. The duct section 53b opens in its rear end portion which is located between the seat 9 at an upper side and the rear wheel 3 at a lower side, and opens to the outside air. A cover member 10 is provided below the seat 9, and the side portion of the duct section 53b is covered with the cover member 10, together with the seat frame 20.

The box cover section 53a of the air discharge duct 53 covers the upper side of the rear portion of the battery unit 21 from the rear. In the above described manner, since the front box section 61 of the air box 51, the rear box section 62 of the air box 51, and the box cover section 53a of the air discharge duct 53 cover the upper side of the battery case 23, the upper side of the battery case 23 can be protected. In addition, the rider seated on the seat 9 can be physically separated away from the battery case 23. Therefore, during driving, the rider does not easily touch the battery case 23, which is an advantage.

The front box section 61 is provided with a ram air supply port 54a used to supply the air from the inner space 61a to the inner space of the battery case 23. The bottom wall 64 serves as the wall which defines the inner space 61a of the front box section 61 and the inner space of the battery case 23. Therefore, the bottom wall may be provided with the ram air supply port. In the present embodiment, the air inlet duct 54 extends upward from the bottom wall 64 through the inner space 61a of the front box section 61. The opening in the upper end portion of the air inlet duct 54 constitutes the ram air supply port 54a. The air inlet duct 54 has a periscope shape and is placed in the inner space 61a of the front box section 61. The air inlet duct 54 is bent at its upper end portion to be oriented horizontally. In the present embodiment, the ram air supply port 54a is oriented rearward. The lower end of the air inlet duct 54 opens in the vicinity of the reverse surface of the bottom wall 64 (i.e., in the vicinity of the inner surface of the upper wall of the battery case 23). This can reduce the space occupied by the air inlet duct 54 in the inner space of the battery case 23 to a smallest possible degree, and hence increase the capacity of the battery 22 to a greatest possible degree.

The battery case 23 has an outlet 23c through which the air flows out of the battery case 23. The air outlet duct 55 is connected to the outlet 23c. The outlet 23c is provided in the upper portion of the rear wall of the battery case 23 and is substantially as high as the upper end portion of the motor unit case 15. The air outlet duct 55 is configured to guide the air discharged from the battery case 23 to the outside through the outlet of the battery case 23. The air outlet duct 55 extends rearward from the rear wall of the battery case 23, is bent, extends upward, and extends into the inner space 62a of the rear box section 62. The air outlet duct 55 opens in its upper end portion located in the inner space 62a of the rear box section 62. The inner space 62a of the rear box section 62 is in communication with the outside via the open section 63a and the air discharge duct 53. Therefore, the air can be discharged from the battery case 23 to the outside through the air outlet duct 55.

Because of the above described structure, the electric motorcycle 1 is provided with the air passage 50 which serves to guide the ram air to the interior of the battery case 23 and discharge the air from the battery case 23 to the outside, as described above.

Specifically, during the driving of the electric motorcycle 1, incoming ram air from the forward direction is taken into the air intake duct 52. Since the opening of the air intake duct 52 faces forward in front of the head pipe 11, the ram air can be suitably taken in therethrough. The air flows rearward through the air intake duct 52 and into the inner space 61a of the front box section 61 through the ram air inlet 61b.

In the interior of the front box section 61, the air is taken into the air inlet duct 55 through the ram air supply port 54a. Then, the air flows downward through the air inlet duct 55 and into the inner space of the battery case 23. In this way, in the present embodiment, the ram air flows into the battery case 23 via the air box 51. Therefore, even when the ram air contains moisture, the moisture can be captured in the interior of the air box 51. Also, the air box 51 is placed adjacently to the upper portion of the battery case 23. Therefore, the air box 51 serves to protect the battery case 23 from rain water and suppress ingress of rain water into the battery case 23. In addition, the bottom wall 64 of the air box 51 also serves as the upper wall of the battery case 23 and the air box 51 is in close proximity to the battery case 23. Therefore, the air taken into the air intake duct 52 can be smoothly supplied to the inner space of the battery case 23, even though the air box 51 is present between the air intake duct 52 and the battery case 23. This makes it possible to suitably cool the battery 22 inside the battery case 23 by air while reducing a possibility of the ingress of water into the battery case 23.

Further, the electric motorcycle 1 of the present embodiment includes the air inlet duct 54 placed in the inner space 61a of the front box section 61 such that it extends upward from the bottom wall 64, and the ram air supply port 54a is provided in the upper end of the air inlet duct 54. This structure allows the moisture captured in the interior of the air box 51 to stay on the bottom wall 64, and hence prevent a situation in which the moisture contained in the ram air is supplied to the battery case 23 through the ram air supply port 54a.

Heat radiated from the battery 22 tends to be transferred to the upper region of the inner space of the battery case 23, by convection. The lower end portion of the air inlet duct 54 opens in the upper region of the inner space of the battery case 23. The air taken into the air inlet duct 54 flows into the front upper region of the inner space of the battery case 23. The outlet 23c is provided in the upper portion of the rear wall of the battery case 23. The air outlet duct 55 is connected to the outlet 23c to guide the air from inside the battery case 23 to the outside. Because of this structure, in the interior of the battery case 23, an air flow moving toward the outlet 23c can be smoothly formed, and is oriented substantially rearward in the upper region of the inner space. Therefore, the heat radiated from the battery 22 can be expelled outside the battery case 23. This makes it possible to prevent a situation in which the air and the heat are accumulated inside the battery case 23.

The air inlet duct 55 is placed at the front end portion of the bottom wall 64. Therefore, a distance from the ram air inlet 61b to the air inlet duct 55 is reduced, which allows the air to be smoothly supplied to the battery case 23. In addition, the air flow moving from the lower end portion of the air inlet duct 55 to the outlet spreads to the whole interior of the battery case 23. As a result, the battery case 23 can be cooled more effectively by air.

Electric components 70 electrically connected to the battery 22 are accommodated in the inner space 61a of the front box section 61. The front box section 61 covers the upper portion of the battery case 23 from above, while the ram air inlet 61b, the ram air supply port 54a and the air inlet duct 54 are located in the front portion of the front box section 61. In this arrangement, a relatively large space is formed in the rear portion of the inner space 61a of the front box section 61. Accordingly, the electric components 70 are placed efficiently in the rear space of the inner space 61a. The electric components 70 are placed on the rear portion of the bottom wall 64. As described above, the bottom wall 64 also serves as the upper wall of the battery case 23. Therefore, electric wires from the electric components 70 are extended downward through the bottom wall 64 and connected to the battery 22, which can reduce the electric wires in length. The electric components 70 include, for example, one or more relays on the electric wire connecting the battery 22 to the inverter (not shown), a DC/DC converter interposed between the battery 22 and an auxiliary machine battery (not shown), one or more relays on the electric wire connecting the battery 22 to the DC/DC converter, one or more relays on the electric wire connecting the battery 22 to a charging connector (not shown), and one or more fuses on the electric wire connecting battery modules of the battery 22 to each other.

A lid 65 is attached to the upper wall of the front box section 61 to open and close the opening formed in the upper wall. The upper portion of the front box section 61 is openable and closable. Therefore, by opening the lid 65, an operator can access the inner space 61a of the front box section 61. The operator can easily carry out maintenance work of the electric components 70.

The air box 51 has a bypass port 63a penetrating the partition wall 63. The inner space 61a of the front box section 61 is in communication with the inner space 62a of the rear box section 62 via the bypass port 63a such that the inner space of the battery case 23 is bypassed. As a result, the inner space 61a of the front box section 61 is in communication with the air discharge duct 53 or the air outlet duct 55.

In the inner space 61a of the front box section 61, the air flow moving from the ram air inlet 61b toward the ram air supply port 54a, and the air flow moving from the ram air inlet 61b toward the bypass port 61c, are formed. In the inner space 61a of the front box section 61, the air flow is activated, and thereby the air can be delivered well from the inner space 61a to the air outlet duct 55. Since the electric components 70 are placed between the ram air inlet 61b and the bypass port 63a, they can be cooled by the air flow moving from the ram air inlet 61b toward the bypass port 63a. If the electric components 70 which tend to radiate high heat (DC/DC converter, relays, fuses, etc., in the above stated examples) are accommodated in the inner space 61a, reliability of the operation of the electric components 70 is easily ensured, which is an advantage. In addition, the electric components 70 which tend to radiate high heat are placed in a space adjacent to the space in which the battery 22 is placed, via the bottom wall 64. This can avoid negative effects on the battery 22 which would be provided by the heat radiated from the electric components 70 and achieve a simplified wire connection between the electric components 70 and the battery 22.

As described above, the electric components 70 are placed on the rear portion of the bottom wall 64. The rear portion of the bottom wall 64 is set higher than the front end portion thereof. Therefore, the bottom wall 64 has a stepped portion 64a between the front end portion and the rear portion. The ram air inlet 61b and the ram air supply port 54a are provided in the front portion of the front box section 61 and placed forward relative to the stepped portion 64a. Because of this structure, the air is blown to the stepped portion 64a through the ram air inlet 61b. Since the ram air supply port 54a is oriented rearward, the air blown to the stepped portion 64a and then flown back is suitably sent to the ram air supply port 54a. Since the air is blown to the stepped portion 64a, moisture is easily separated from the air, which reduces a possibility of the ingress of moisture into the battery case 23. After flowing through the ram air inlet 61b, the air moves beyond the stepped portion 64a toward the bypass port 63a. Therefore, the electric components 70 are protected from moisture contained in the air. In the present embodiment, the ram air inlet 61b is placed lower than the rear portion of the bottom wall 64. This can facilitate the separation of the moisture in the stepped portion 64a.

If there can be formed an air flow which bypasses the battery case 23, the air supplied to the inner space of the battery case 23 may be likely to become insufficient. To avoid this, the outlet 23c is attached with an air exhaust fan 81. Although FIG. 2 exemplarily shows a case where the air exhaust fan 81 is placed inside the battery case 23, it may be placed outside the battery case 23 or within the air outlet duct 55. By the operation of the air exhaust fan 81, the air flow moving toward the outlet 23c can be forcibly formed in the inner space of the battery case 23, and hence the air flow moving from the inner space of the front box section 61 toward the inner space of the battery case 23 can be formed. This can avoid a situation in which the battery 22 is cooled insufficiently.

The operation timing of the air exhaust fan 81 is not particularly limited. For example, the air exhaust fan 81 may operate when an ignition switch of the electric motorcycle 1 is ON. Or, the electric motorcycle 1 may include a temperature sensor 82 for detecting the temperature of the battery 22, and a fan controller 83 for controlling the operation of the air exhaust fan 81, and the fan controller 83 may control the air exhaust fan 81 such that it operates when the temperature of the battery 22 which is detected by the temperature sensor 82 exceeds a predetermined temperature. Or, the fan controller 83 may control the air exhaust fan 81 such that it operates during charging of the battery 22.

Figure 3:
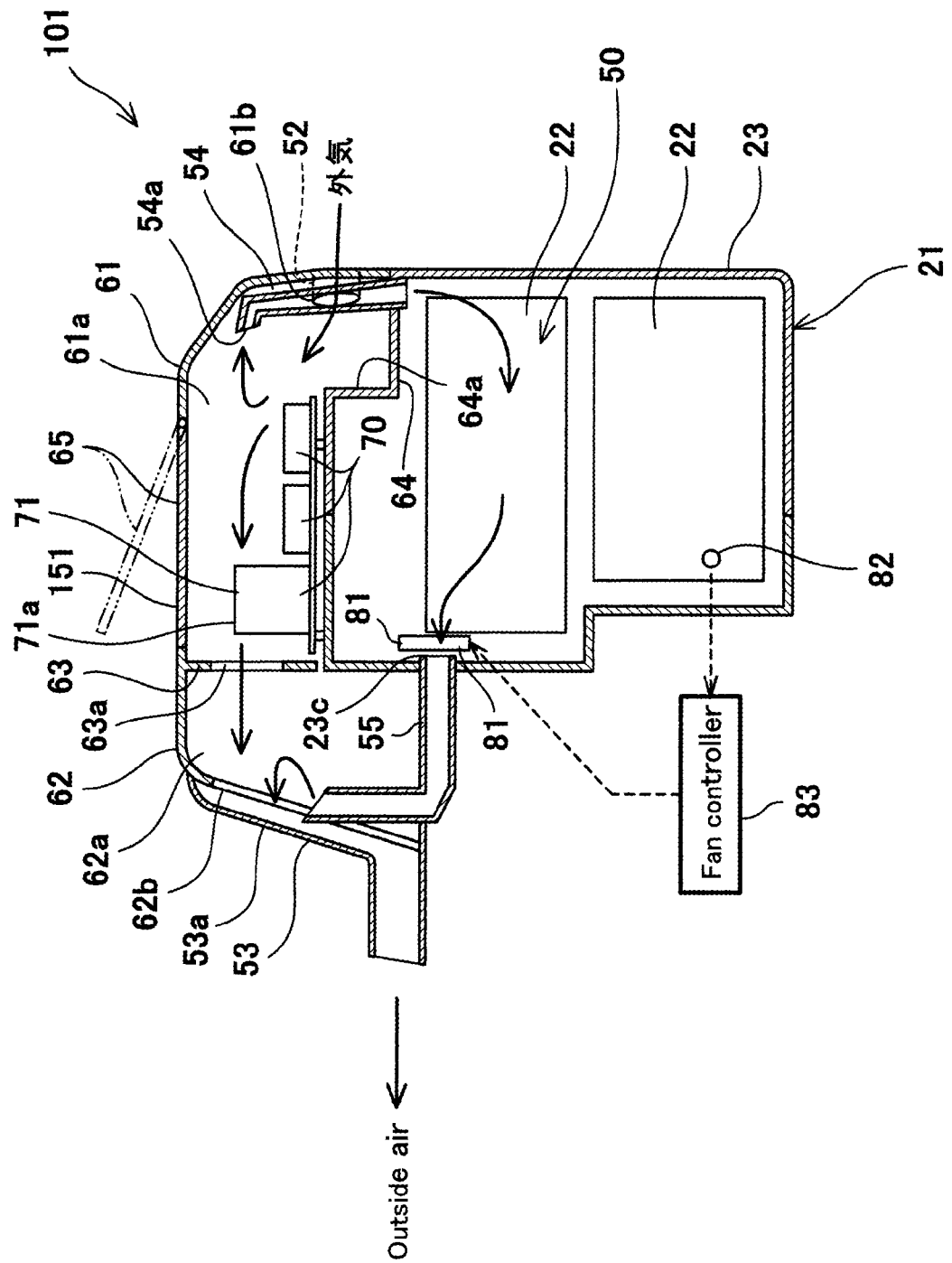
FIG. 3 is a cross-sectional view of a battery case and an air box of an electric motorcycle which is an exemplary straddle electric vehicle according to Embodiment 2 of the present invention.

FIG. 3 is a cross-sectional view of a battery case 23 and an air box 151 of an electric motorcycle 101 which is an exemplary straddle electric vehicle according to Embodiment 2 of the present invention. Hereinafter, differences between Embodiment 2 and Embodiment 1 will be mainly described.

As shown in FIG. 3, the air box 151 according to the present embodiment has substantially the same shape as that of the air box of Embodiment 1, and includes the front box section 61, the rear box section 62, the partition wall 63, the bottom wall 64 and the lid 65. The plurality of electric components 70 connected to the battery 22 are accommodated in the inner space 61a of the front box section 61.

In the present embodiment, the electric components 70 include a charging connector 71. The charging connector 71 is placed such that a charging port 71a is oriented upward and the charging connector 71 overlaps with the lid 65 in a closed position as viewed from above. Therefore, by opening the lid 65, the operator can clearly see the charging connector 71 through the opening formed in the upper wall of the front box section 61. Through this opening, the operator can easily access the charging connector 71. By utilizing the inner space (in the present embodiment, the inner space 61a of the front box section 61) of the air box 51 which is opened and closed by the lid 65, as the space in which the charging connector 71 is accommodated, battery charging can be easily carried out, which is an advantage. In addition, in the present embodiment, the ram air inlet 61b, and the rear portion and the stepped portion 64a of the bottom wall 64 are placed as in Embodiment 1. This can protect the charging connector 71 from moisture even when the ram air contains moisture. The charging connector 71 may be accommodated in the inner space 62a of the rear box section 62 so long as the rear box section 62 is openable and closable.

Figure 4:
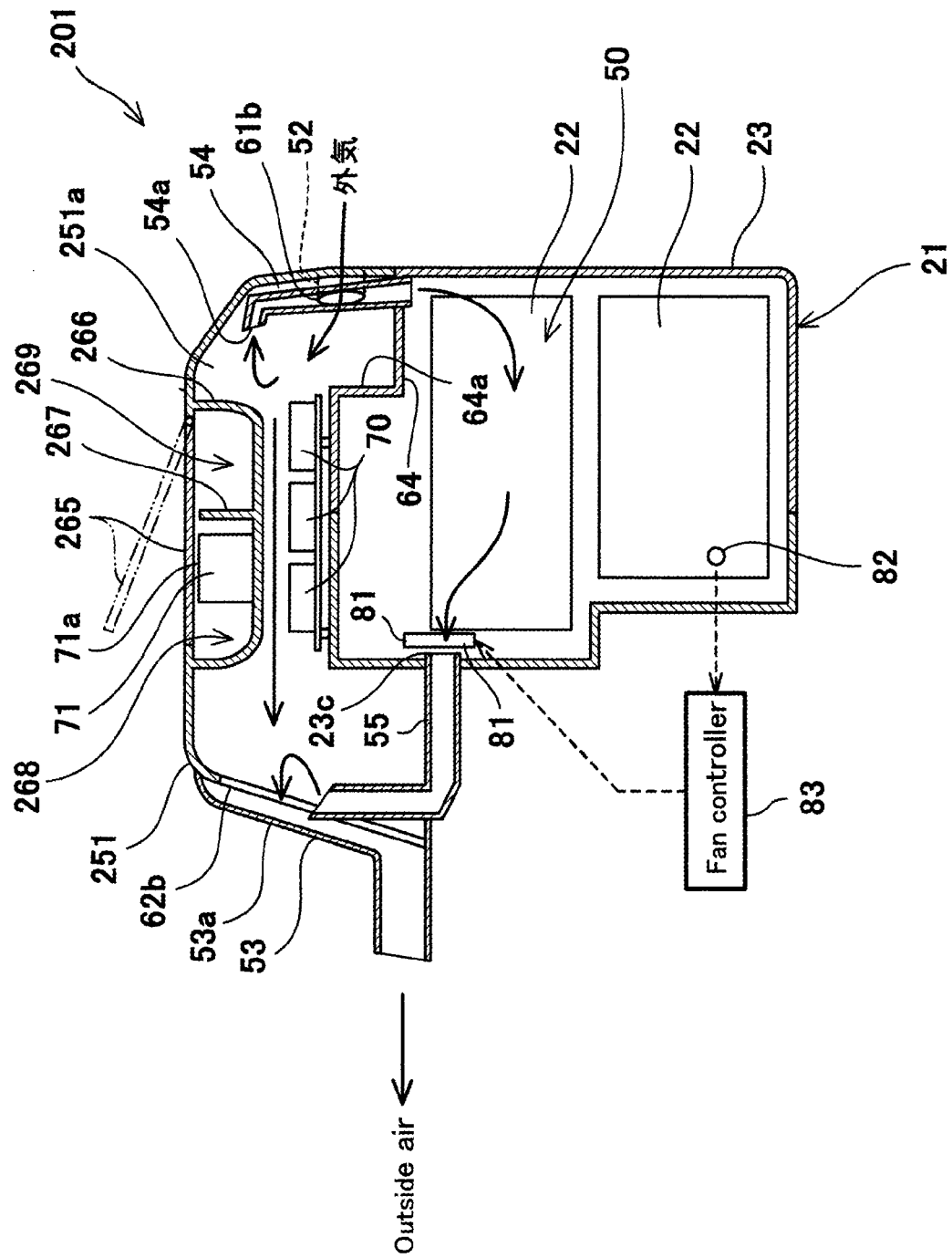
FIG. 4 is a cross-sectional view of a battery case and an air box of an electric motorcycle which is an exemplary straddle electric vehicle according to Embodiment 3 of the present invention.

FIG. 4 is a cross-sectional view of a battery case 23 and an air box 251 of an electric motorcycle 201 which is an exemplary straddle electric vehicle according to Embodiment 3 of the present invention. Hereinafter, differences between Embodiment 3 and the above described embodiments will be mainly described.

As shown in FIG. 4, the air box 251 of the present embodiment does not include a partition wall unlike the above described embodiments, and includes an inner space 251a in which the inner space of the front box section and the inner space of the rear box section of the above described embodiments are integrated continuously. The front end portion of the air box 251 is provided with the ram air inlet 61b as in the front box section of the above described embodiments, and the rear wall of the air box 251 is provided with the open section 62b as in the rear box section of the above described embodiments. The box cover section 53a of the air discharge duct 53 is attached to the rear wall of the air box 251 from the rear to close the open section 62b.

The air box 251 of the present embodiment has a recess section 266 which is formed by recessing downward a central portion of the upper wall along the forward or rearward direction. A lid 265 is attached to the upper wall of the air box 251 to open and close the inner space of the recess section 266.

The charging connector 71 is accommodated in the inner space of the recess section 266. The charging port 71a of the charging connector 71 is oriented upward. Therefore, as in Embodiment 2, by opening the lid 265, the operator can easily perform charging of the battery.

The recess section 266 is provided with a separating wall 267 extending vertically upward from the bottom wall and in a rightward or leftward direction. The separating wall 267 separates the inner space of the recess section 266 into a rear space 268 and a front space 269. The charging connector is accommodated in the rear space. The front space 269 is an empty space and is opened and closed by the lid 265. The rider can utilize this front space 269 as a space in which small articles are accommodated. In this case, the space in which the electric components are accommodated is spatially separated from the space in which small articles are accommodated.

Because of the recess section 266, the electric components 70 placed on the bottom wall 64 are close to the bottom wall of the recess section 266. This causes an increase in a flow velocity of the air flowing from the ram air inlet 61b toward the open section 62b, in the vicinity of the electric components 70. Therefore, the electric components 70 can be suitably cooled by air. Also, a passage resistance in the vicinity of the electric components 70 increases. This causes an increase in the amount of the air supplied to the battery 22. In this way, the battery 22 can be suitably cooled.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has an advantage that ingress of a moisture into a battery case can be suitably suppressed, and a battery can be suitably cooled by air, and is effectively applied to a straddle electric vehicle including a battery case.

The invention claimed is:

1. A straddle electric vehicle which drives by driving power generated by an electric motor, the straddle electric vehicle comprising:
   a battery case accommodating a battery which is an electric power supply for the electric motor; and
   an air box attached to an upper portion of the battery case,
   wherein the air box includes a ram air inlet through which ram air flows into an inner space of the air box, a ram air supply port through which the air is supplied from the inner space of the air box to the battery case, and an open section which is provided separately from the ram air supply port and through which the air flows out of the inner space of the air box, and
   wherein an air flow moving from the ram air inlet toward the ram air supply port and an air flow moving from the ram air inlet toward the open section are formed in the inner space of the air box.

2. The straddle electric vehicle according to claim 1,
   wherein an electric component is accommodated inside the air box, and
   wherein the electric component is connected to the battery and is selected from the group consisting of a relay, a fuse, and a converter.

3. The straddle electric vehicle according to claim 1,
   wherein the battery case is provided with an air inlet duct extending upward from the upper portion of the battery case in the inner space of the air box.

4. The straddle electric vehicle according to claim 1,
   wherein the battery case is provided with an outlet through which the air flows out of the battery case and an air outlet duct is connected to the outlet to guide the air discharged from the battery case to outside.

5. The straddle electric vehicle according to claim 4,
   wherein the air outlet duct is provided at a rear portion of the air box, and a bypass port is provided in the rear portion of the air box to communicate the inner space of the air box with an interior of the air outlet duct.

6. The straddle electric vehicle according to claim 4,
   wherein the air box is placed forward relative to a seat, and
   wherein the air box covers the upper portion of the battery case from above, and the air outlet duct covers an upper side of a rear portion of the battery case from the rear.

7. The straddle electric vehicle according to claim 1,
   wherein an upper portion of the air box is openable and closable.

8. The straddle electric vehicle according to claim 1,
   wherein the ram air supply port is located above a bottom wall of the air box.

9. The straddle electric vehicle according to claim 8,
   wherein the bottom wall of the air box has a vertically stepped portion.

10. The straddle electric vehicle according to claim 9,
    wherein air is blown to the stepped portion through the ram air inlet.

11. A straddle electric vehicle which drives by driving power generated by an electric motor, the straddle electric vehicle comprising:
    a battery case accommodating a battery which is an electric power supply for the electric motor; and
    an air box attached to an upper portion of the battery case,
    wherein the air box includes a ram air inlet through which ram air flows into the air box, and a ram air supply port through which the air is supplied from inside the air box to the battery case,
    wherein the ram air supply port is placed above a bottom wall of the air box and the bottom wall of the air box has a vertically stepped portion and
    wherein an electric component is accommodated in the air box such that the electric component is placed on a portion of the bottom wall which portion is set higher, the stepped portion being provided between the portion set higher and a remaining portion of the bottom wall, and
    wherein the electric component is connected to the battery and is selected from the group consisting of a relay, a fuse, and a converter.

12. The straddle electric vehicle according to claim 2,
    wherein a flow velocity of the air flowing inside the air box is made higher in a region in the vicinity of the electric component than in a region other than the region in the vicinity of the electric component.

13. The straddle electric vehicle according to claim 2,
    wherein a passage resistance inside the air box is made higher in a region in the vicinity of the electric component than in a region other than the region in the vicinity of the electric component.

14. The straddle electric vehicle according to claim 3,
    wherein the ram air supply port is provided in an upper end of the air inlet duct.

15. The straddle electric vehicle according to claim 14,
    wherein the air inlet duct is bent such that its upper end is oriented horizontally.

16. The straddle electric vehicle according to claim 1,
    wherein the ram air inlet and the ram air supply port are oriented rearward.

17. The straddle electric vehicle according to claim 1,
    wherein the air box captures moisture contained in the ram air flowing through the ram air inlet, and then the air from which the moisture has been removed is supplied to the battery case through the ram air supply port.

18. The straddle electric vehicle accordingly to claim 1,
    wherein the ram air supply port is placed above the ram air inlet.

19. A straddle electric vehicle which drives by driving power generated by an electric motor, the straddle electric vehicle comprising:
    a battery case accommodating a battery which is an electric power supply for the electric motor; and
    an air box attached to an upper portion of the battery case,
    wherein the air box includes a ram air inlet through which ram air flows into the air box, and a ram air supply port through which the air is supplied from inside the air box to the battery case, and
    wherein the ram air supply port is placed above the ram air inlet.

* * * * *